United States Patent
Lara

(10) Patent No.: US 10,057,551 B2
(45) Date of Patent: Aug. 21, 2018

(54) WIRELESS AUDIO AND VIDEO HOME THEATER CEILING PROJECTOR SYSTEM

(71) Applicant: Damian Lara, CD. Juarez (MX)

(72) Inventor: Damian Lara, CD. Juarez (MX)

( * ) Notice: Subject to any disclaimer, the term of this patent is extended or adjusted under 35 U.S.C. 154(b) by 0 days.

(21) Appl. No.: 15/273,597

(22) Filed: Sep. 22, 2016

(65) Prior Publication Data

US 2018/0084233 A1    Mar. 22, 2018

(51) Int. Cl.
*H04N 9/31* (2006.01)
*H04R 5/02* (2006.01)
*H04R 1/28* (2006.01)

(52) U.S. Cl.
CPC .......... *H04N 9/3141* (2013.01); *H04R 1/2873* (2013.01); *H04R 5/02* (2013.01); *H04R 2201/021* (2013.01)

(58) Field of Classification Search
CPC ...... H04N 9/3141; H04R 1/2873; H04R 5/02; H04R 2201/021
See application file for complete search history.

(56) References Cited

U.S. PATENT DOCUMENTS

| | | | | |
|---|---|---|---|---|
| 2001/0047256 | A1* | 11/2001 | Tsurushima | G11B 20/00007 704/200 |
| 2004/0217948 | A1* | 11/2004 | Kawasaki | G06F 3/14 345/204 |
| 2007/0058133 | A1* | 3/2007 | Totani | G03B 9/06 353/20 |
| 2007/0121083 | A1* | 5/2007 | Iinuma | H04N 9/3141 353/85 |

* cited by examiner

*Primary Examiner* — Michael Teitelbaum

(57) ABSTRACT

Audio and video home theater ceiling projector system that optionally replaces any type of home theater video projector with the advantage of ten audio channels; the system simplifies in one main unit and two peripheral devices a cinema audio and video projection, it also allows the user to install, use, and distribute a complicated system of this type in a very simple way and to change the loudspeaker driver layout just by rotating the main unit installed at the electrical outlet box of the lamp, the invention is equipped with a bridged wall switch which allows controlling the main unit lights without interrupting its operation and the system receives the audio and video signal via wireless to decode all audio channels to emit sounds and effects in different directions to immerse the listener in a three-dimensional sound during a video playing.

18 Claims, 12 Drawing Sheets

US 10,057,551 B2

WIRELESS AUDIO AND VIDEO HOME THEATER CEILING PROJECTOR SYSTEM

CROSS REFERENCE TO RELATED APPLICATIONS

The present application claims priority to the earlier filed provisional application No. U.S. 62/293,303, and hereby incorporates subject matter of the provisional application in its entirely.

BACKGROUND OF THE INVENTION

1.—Field of Invention

The invention relates to the field of Home Entertainment Audio and Video. More specifically, the invention comprises an entertainment audio and video system which optionally replaces any conventional type of home theater video projector device that in a manner immerses the listener into a realistic three-dimensional sound environment related to sound effects that are played itself during a video or movie projection.

2.—Brief Summary of the Invention

There are other wireless projectors equipped with loudspeakers to reproduce the sound of the video projected but no one has ten channel audio loudspeakers for Music and Home Theater Audio which immerse the listener into a realistic three-dimensional sound environment. Ten channel audio devices are complicated systems with many loudspeakers that must be positioned around the room; some versions require complicated placement such as in different parts of the ceiling, users of such systems find them complicated due the installation and wiring necessary. Other home theater audio devices are simplified by using a main unit installed under a television or under a screen where a movie or video is played, the disadvantage of these devices is the less number of channels or loudspeakers that result in the loss of three-dimensional sound effect. Other versions are installed under the television or screen where the video or movie is played and have two wire or wireless loudspeakers that must be positioned on the rear side of the room, opposite to where the movie is displayed, these two loudspeakers must be installed to enable the system to create a three-dimensional sound, giving as a result the need to distribute or to install the loudspeakers around the room to have a three-dimensional sound. Users might find complicated to change the location of the video projection once the audio system is installed in accordance to the predetermined layout of the loudspeakers, relocation of the video projected without relocation of the loudspeakers affect the association of the sound and effects in specific designated locations around the room which avoid to match sounds with images displayed on screen, it concludes that every time the video projection change its position inside a room a new loudspeakers layout installation is needed. Related documents to the invention: Provisional patent application No. 61/749,789, Provisional patent application No. 61/835,466, Provisional patent application 61/914,854, PCT/US2014/010466, US Patent Application 20150189439.

The wireless audio and video home theater ceiling video projector which for this application is presented, optionally replaces any type of home theater video projector by having a unique ten channel audio system with nine loudspeakers and one floor double wireless subwoofer, this system simplifies in one main ceiling unit and two peripheral devices any kind of home theater video projector with the advantage of ten audio channel home theater system which also allows the user to install, use, distribute and redistribute a complicated system of this type in a very simple way and to change the loudspeaker layout just by rotating the main unit of the invention.

Details of the pieces and characteristics of the invention are shown and described in detail in the provided drawings and description.

DETAILED DESCRIPTION OF THE INVENTION

Figure 4:
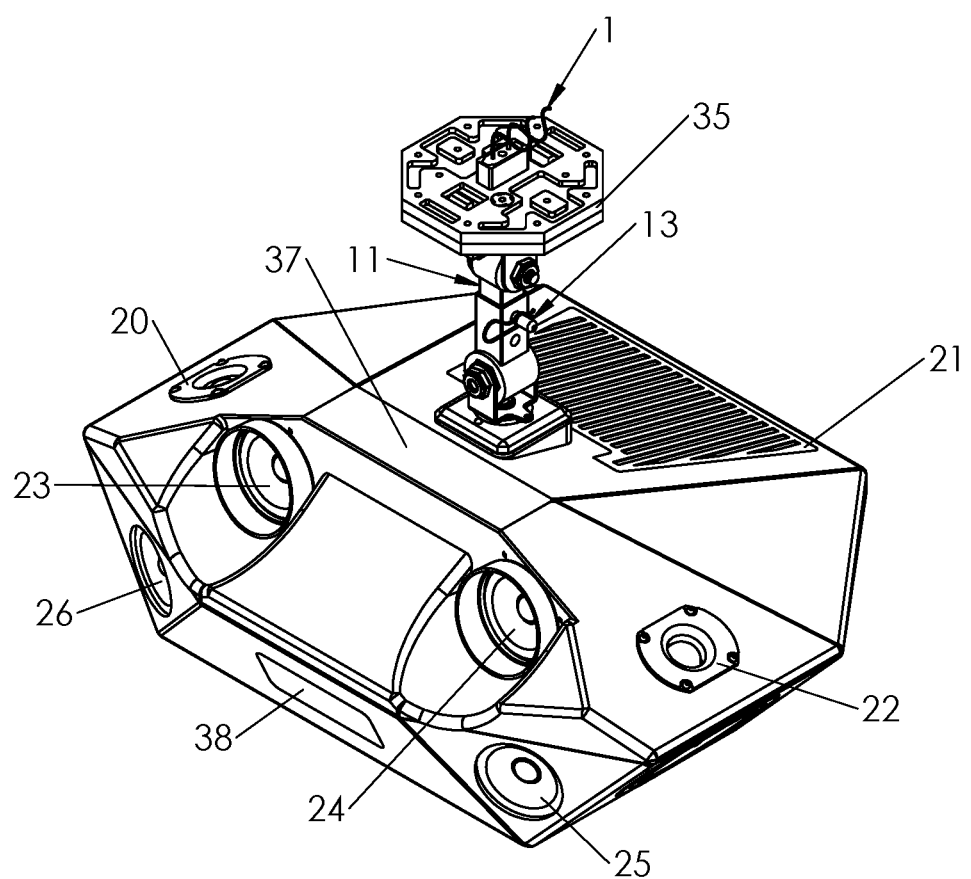
FIG. 4 is a perspective front upper view of the wireless audio and video home theater ceiling main unit.
Figure 5:
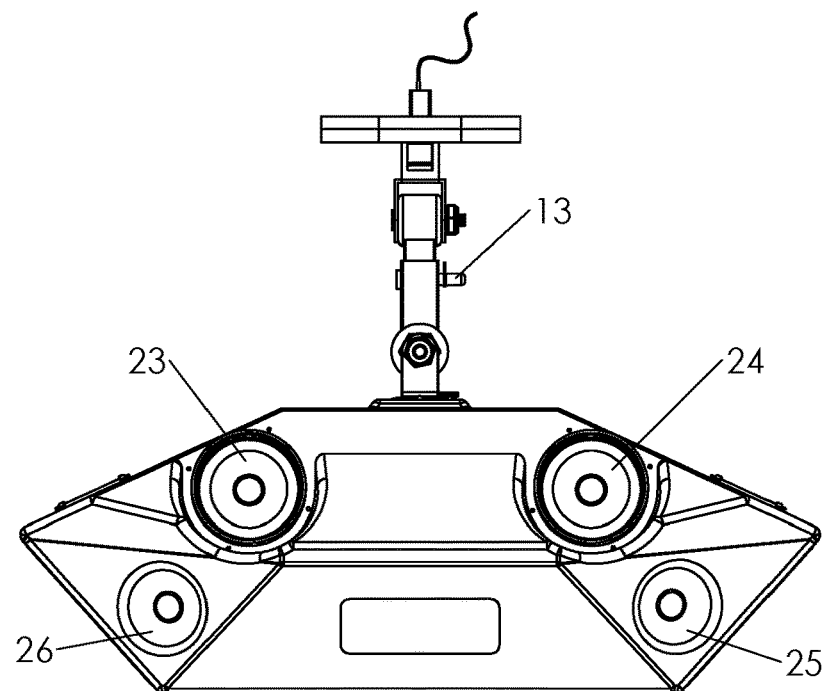
FIG. 5 is a front view of the wireless audio and video home theater ceiling main unit.
Figure 6:
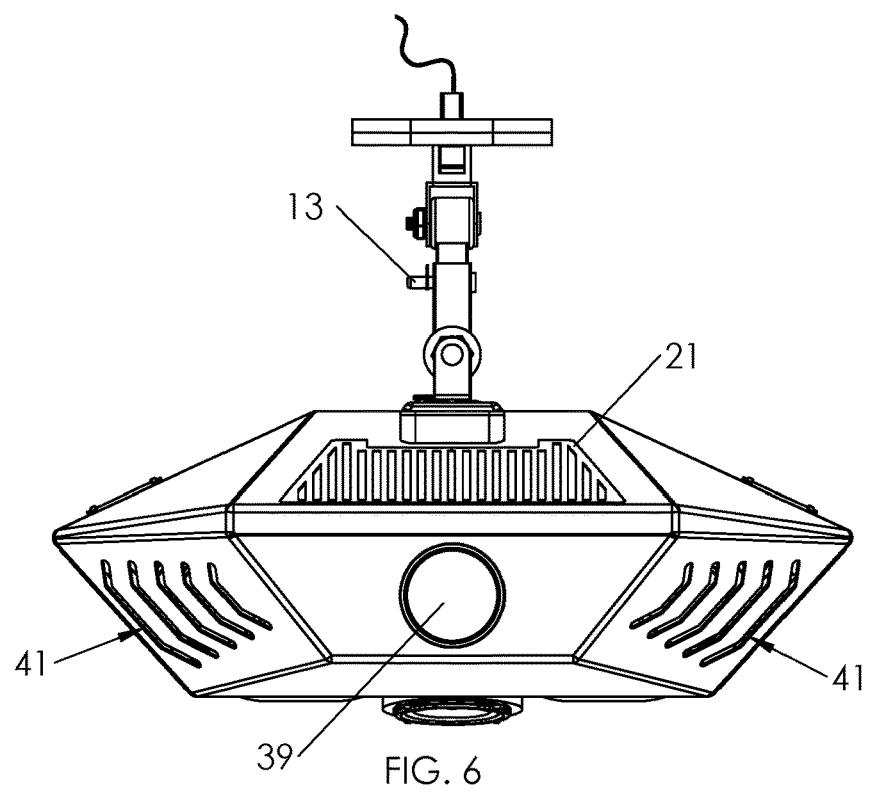
FIG. 6 is a rear view of the wireless audio and video home theater ceiling main unit.
Figure 7:
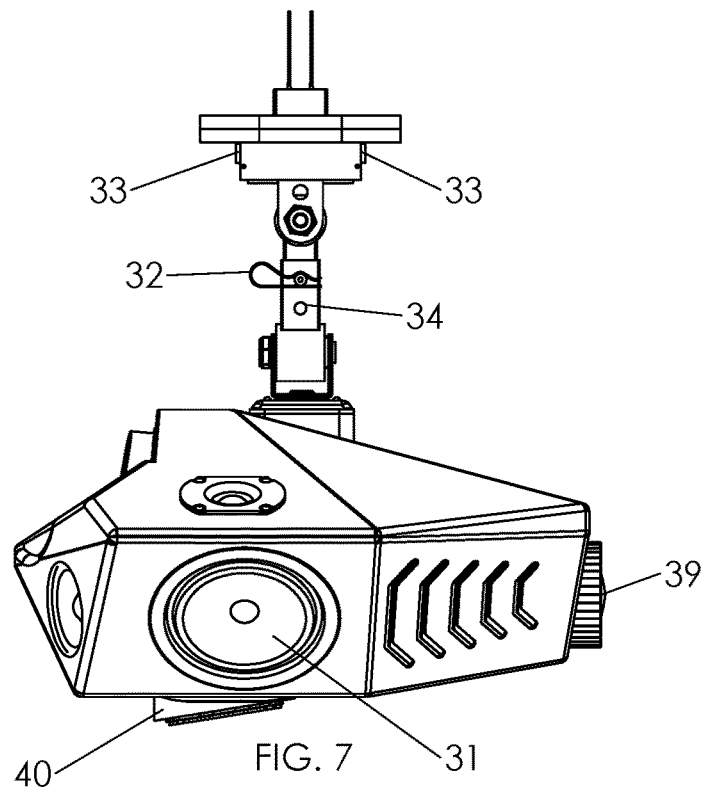
FIG. 7 is a right view of the wireless audio and video home theater ceiling main unit.
Figure 8:
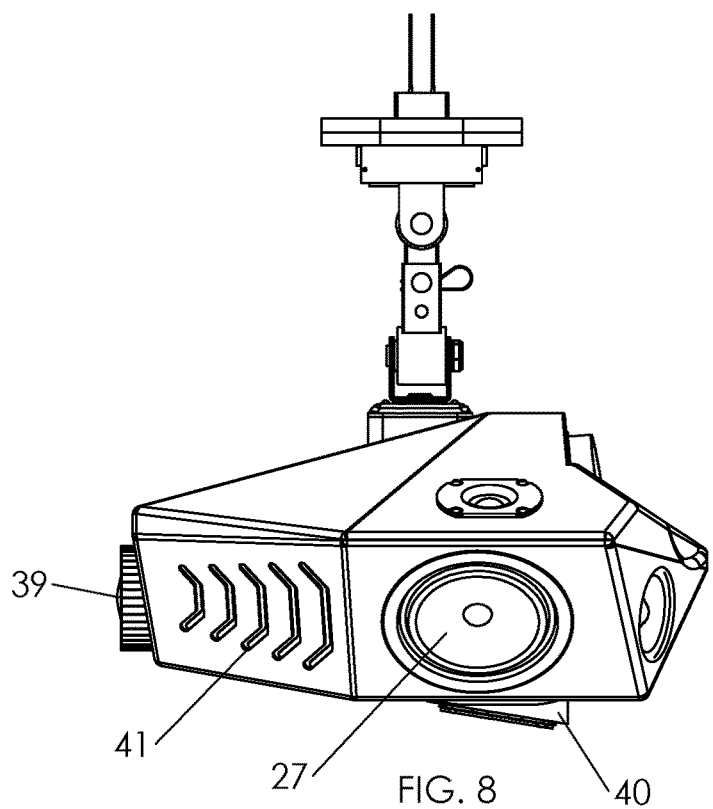
FIG. 8 is a left view of the wireless audio and video home theater ceiling main unit.
Figure 9:
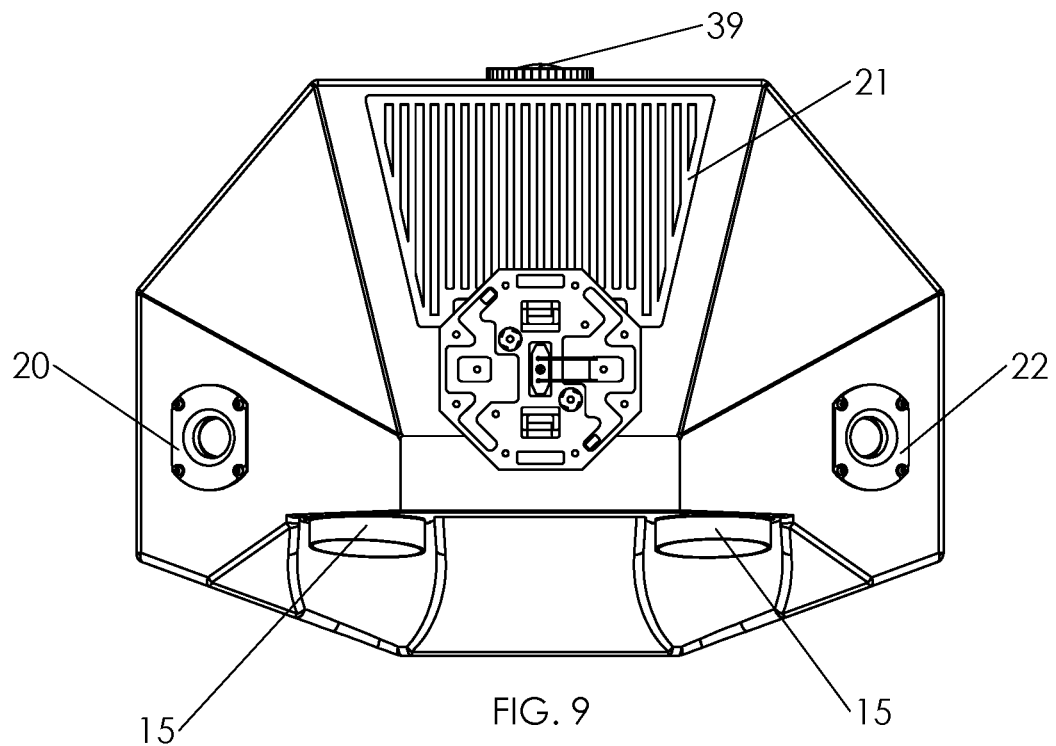
FIG. 9 is the top view of the wireless audio and video home theater ceiling main unit.
Figure 10:
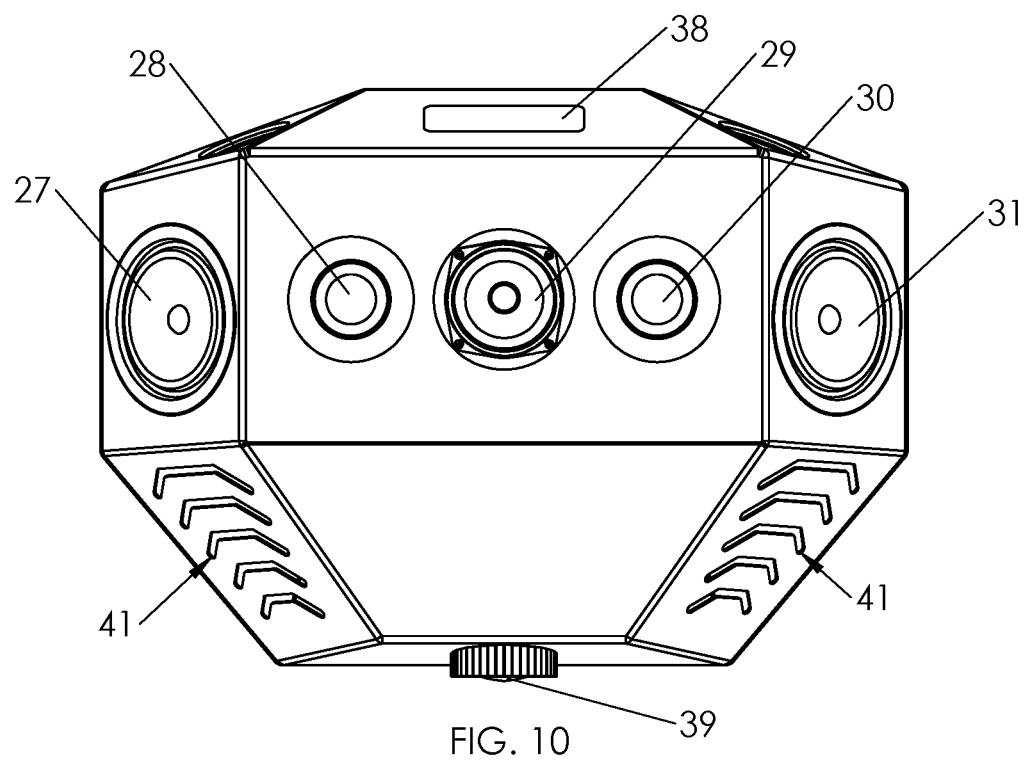
FIG. 10 is the bottom view of the wireless audio and video home theater ceiling main unit.
Figure 11:
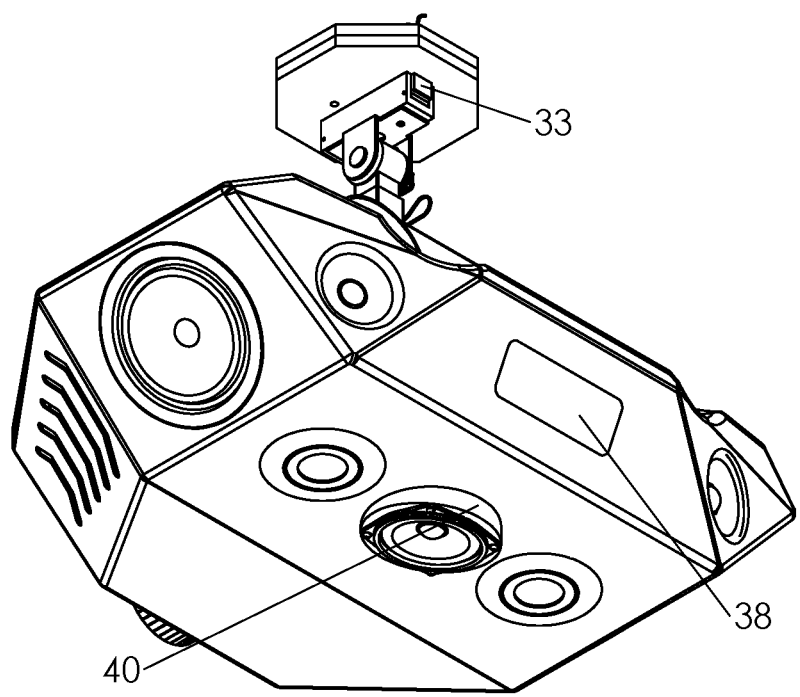
FIG. 11 is a perspective bottom view of the wireless audio and video home theater ceiling main unit.
Figure 12:
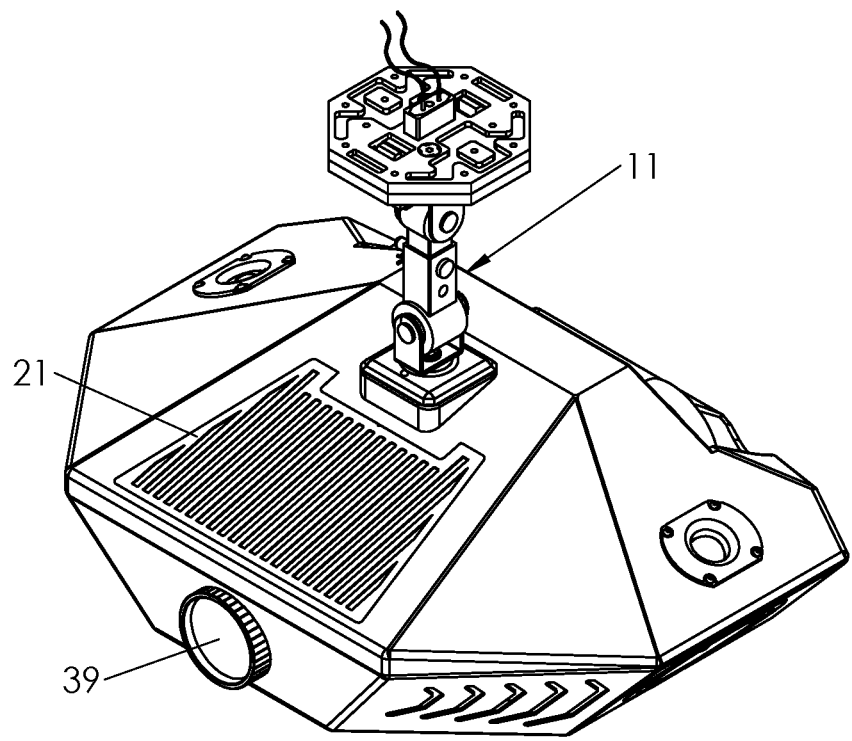
FIG. 12 is a perspective rear upper view of the wireless audio and video home theater ceiling main unit.

The description refers to the invention of an audio and video projection system for home theater which has a main unit FIG. 4 designed to be mounted on the ceiling and can be used for projecting video and reproduce its audio track using as a playing source a smart phone, tablet, computer or any device that supports wireless multimedia, Bluetooth® or WI-FI®. The main unit of the invention is designed to be placed on the ceiling of the room where can be leveled to project on the wall or screen, the main unit has the function to receive the wireless audio and video signal from any compatible wireless device and can be aimed to any direction to project the video and produce the immerse sound that works as it is described in this specification. For purposes of description, the following terms have the associated meanings: "driver" means single electro-acoustic transducer that produces sound in response to an electrical audio input signal, "channel" is an audio signal plus metadata in which the position is coded as a channel identifier to set the pre-defined set of loudspeaker zones with associated locations, "sound effect" refers to a recorded real or synthesized sound related with an audio track of a video which can be associated in accordance with the images projected of a video and which can be mixed with music and other ambience sounds, "Three-dimensional sound effect" sound effects which can be listened inside a room at different locations and not as they are coming from a single specific location in accordance to a three-dimensional space. The invention encompasses the main unit FIG. 4 and two peripheral additional wireless devices which are necessary for its operation and which are described as an audible and sub audible double wireless subwoofer unit FIG. 14 and a bridged wall switch FIG. 13. The main unit FIG. 4 refers to a device designed to be installed on the ceiling where usually an electrical outlet box is found and which supplies energy for a lamp in a house, business or any roofed area, this device is equipped with a wireless interface, Bluetooth® and WI-FI® receivers to receive a wireless audio and video signal from any compatible player device, the audio signal is decoded and played through the different channels assigned to the different loudspeaker drivers; the main unit simultaneously retransmits the signal for the bass through a wireless transmitter to make these low sounds can be reproduced through the wireless receiver double subwoofer located on the floor. The main unit is equipped with nine loudspeakers drivers which emit sounds separated by channels at different angles to emulate the ambience of a three-dimensional sound used in the different soundtracks of audio formats used for films in the known versions of Dolby or DTS 2.1, 5.1, 7.1, Dolby Atmos® 9.1, 9.2 and DTS:X. The invention main unit FIG. 4 has nine loudspeaker drivers which are aimed at different directions and allow the sound to be listened in three dimensions regardless if the listeners are in an open area, this is accomplished thru loudspeaker angles that cover around, below and upper areas and by emitting the sound from the center of the area where the main unit system is installed. If the main unit is in a room the loudspeaker drivers reflect the sound aimed to the ceiling and the walls which allow the loudspeakers drivers to produce the effect of surround sound in three dimensions.

The invention described has a main unit which is equipped with a lens (39) on its back to project the video; it is equipped with nine loudspeaker drivers aimed to different directions and includes one double wireless floor subwoofer to emit bass and low frequencies, all these loudspeaker drivers are separated by channels and the setup is to be listened while the audience is seated in front of the video projection at the time the system is operating, the loudspeaker drivers emit the sound effects in accordance with the setup as described in the following layout: center loudspeaker driver (29), located at the center of the bottom of the main unit placed to emit sounds that come in appearance related with sounds situated in the center of the screen, front left loudspeaker driver (27), located at the left side at the bottom of the main unit placed to emit sounds that come in appearance related with sounds situated in the left side of the screen, front right loudspeaker driver (31), located at the right side at the bottom of the main unit placed to emit sounds that come in appearance related with sounds situated in the right side of the screen, left surround loudspeaker driver (26), located at the bottom in the front in the left side of the main unit placed to emit sounds that are perceived on the left side of the room, right surround loudspeaker driver (25), located at bottom in the front in the right side of the main unit placed to emit sounds that are perceived in the right side of the room. In the upper frontal part of the main unit it has a left loudspeaker (23) and a right loudspeaker (24) these driver loudspeakers are integrated to be part of the audio angle dispersion reducers described in FIG. 3A and FIG. 3B both are characterized by a front ring tube (15) around each one of the drivers, they are muted at their rear part by a tube (17) and a foam (19) to avoid that the sound that they emit at their back produce a sound resonant effect inside the acoustic box of the main unit, these audio driver angle dispersion reducers are designed to avoid the listener to perceive the audio as coming from the main unit; the audio angle dispersion reducers have the characteristic of emitting a narrow audio beam with more sound intensity which direct the audio beam against the rear wall to be reflected, one of these drivers is defined as left rear loudspeaker (23) located in the front at the left side at the top of the main unit placed to emit sounds that are perceived in the left rear part of the room, the other driver is defined as right rear loudspeaker (24) located in the front at the right at the top of the main unit placed to emit sounds that are perceived in the rear right part of the room.

Figure 16:
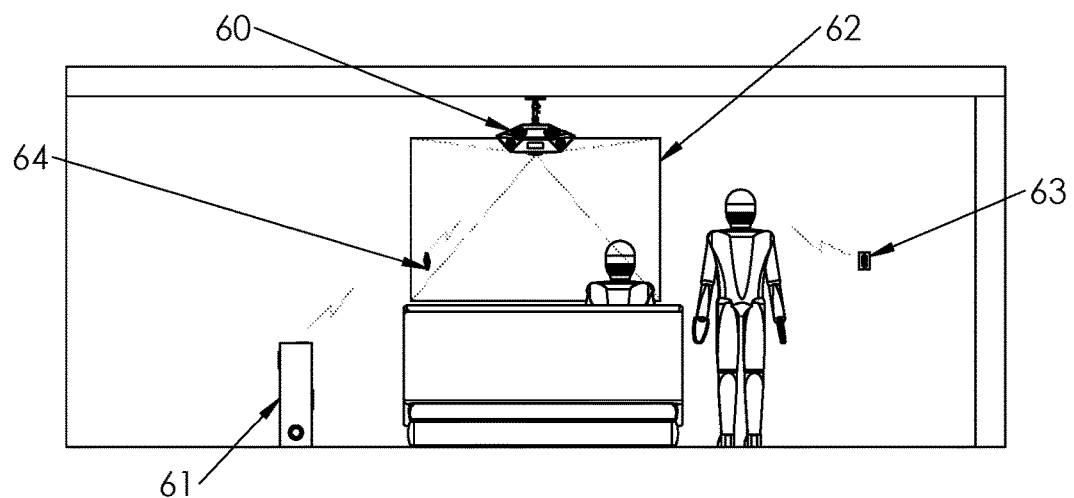
FIG. 16 is a front view of a room with the complete invention and its peripherals installed with a demonstrative simulated video projection and a smart phone as a playing audio and video device.
Figure 17:
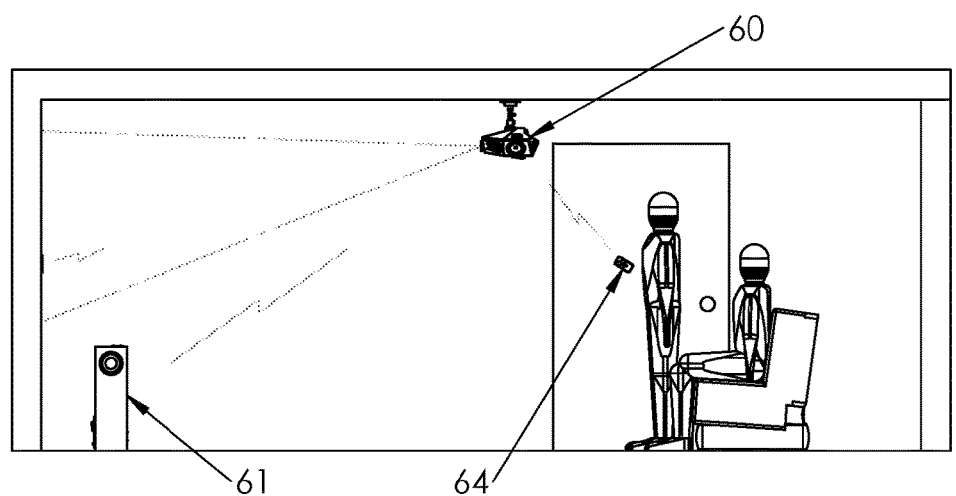
FIG. 17 is a side view of a room with the complete invention and its peripherals installed with a demonstrative simulated video projection, a smart phone as a playing audio and video device with simulated people, door and seat inside the room.

The main unit has on its upper angled sides two opposite drivers directed to the ceiling and are defined as overhead loudspeakers drivers; the left overhead loudspeaker driver (20) is located on the left side at the top of the main unit placed to emit sounds which are perceived in the left side of the ceiling of the room, the other overhead driver is separated by other channel to work as the overhead right loudspeaker driver (22), located on the right side at the top of the main unit placed to emit sounds which are perceived in the right side of the ceiling of the room; the main unit as described with number (60) in FIG. 16 and FIG. 17 transmits simultaneously in real time the wireless signals for the double subwoofer located on the floor (61) which can be electrical powered at any outlet in the area to emit bass sounds and low frequencies which can be perceived in an audible and sub audible way from anywhere in the room without specific direction. The main unit has a lens on its back (39) that project the video and can be focused to any direction around the room; it will match with all the sounds and effects projected on the images at the time the main unit is rotated at any direction needed or wanted. The main unit has a spotlight on the bottom of the left (28) and a spotlight on the bottom of the right (30) controlled through the bridged wall switch which has as a main function to turn on and turn off the lights wirelessly without interrupting the electrical power supplied to the main unit, this bridged wall switch FIG. 13 has an independent switch (47) used to cut the power to reset the system; the spotlights of the main unit are equipped to replace the need of lighting which is subtracted when the position of the lamp is used to attach the main unit to the ceiling. The outlet base is design to be connected to the electrical energy of the outlet electrical box of the lamp and to support the total weight of the main unit with the capacity of providing at the time of electrical power through the multidirectional mounting bracket plugs (10), the multidirectional mounting bracket support latches (8) fit together and firmly attach to support the main unit and to enable it to be aimed at any direction; the multidirectional mounting bracket has an enlargement and adjustable mechanism (11) to level and to adjust the height of the main unit in a position that allow to fix any slope of inclination of the ceiling or height, the multidirectional mounting bracket also has a rotor (12) which enables to position the main unit at any direction around allowing to project the video to the necessary direction and to set simultaneously the loudspeaker layout as required in a room.

Figure 1A:
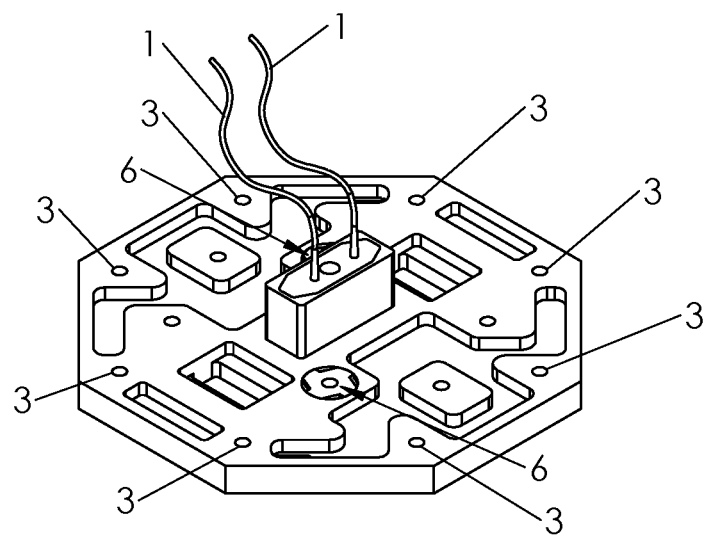
FIG. 1A is a perspective rear view of the outlet base which is used to place and attach the main unit to the ceiling to support and to feed the main unit of the invention with electrical energy.
Figure 1B:
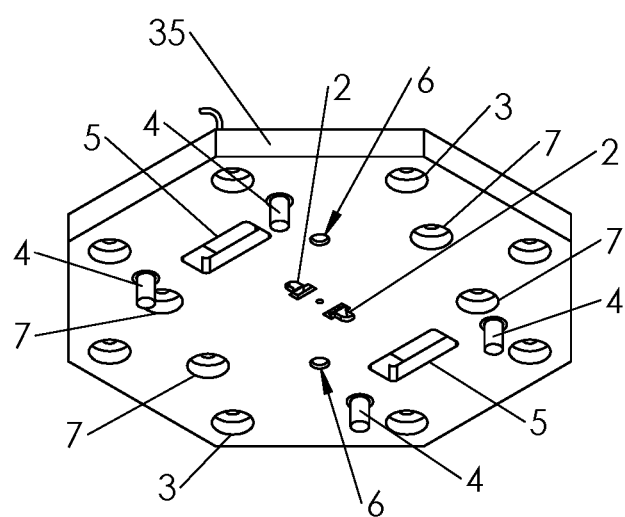
FIG. 1B is a perspective face view of the outlet base which is used to place and attach the main unit to the ceiling to support and to feed the main unit of the invention with electrical energy.
Figure 2A:
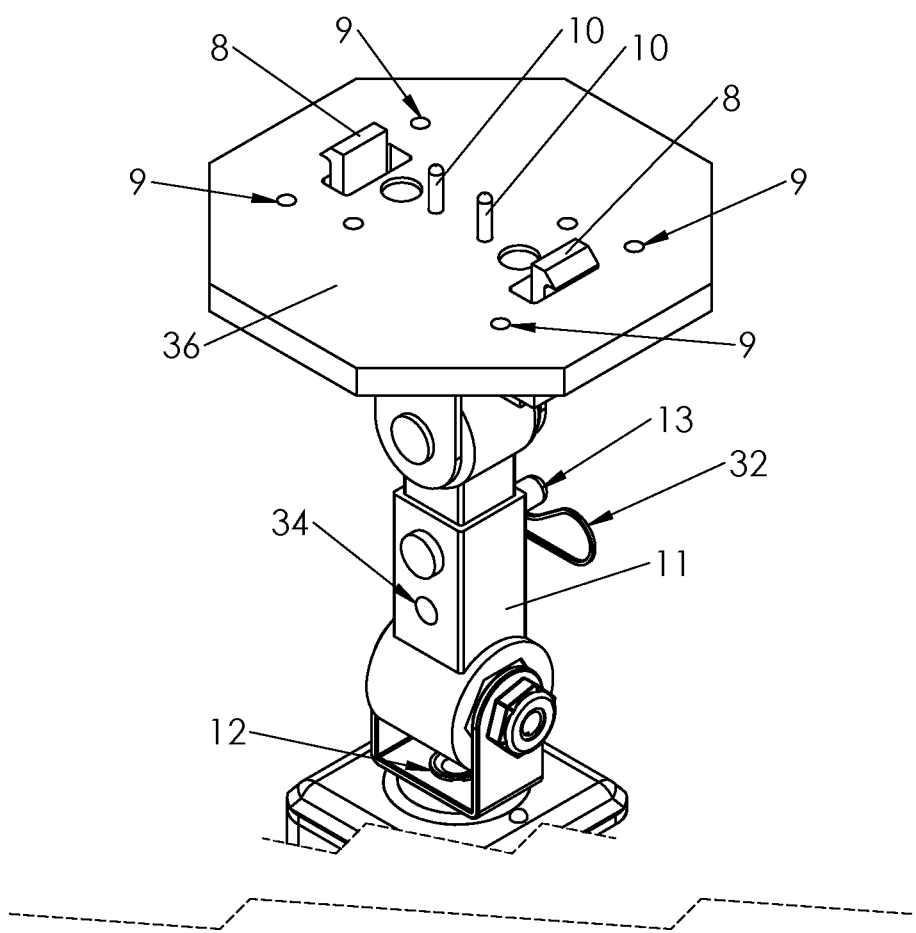
FIG. 2A is a perspective view of the multidirectional mounting bracket that provide support and mobility to the main unit and which also provides electrical energy through the alternate currency plugs which connect to the outlet base.

Specifically the outlet base described in FIG. 1A and FIG. 1B is used to place and attach the main unit to the ceiling and to provide it with electrical energy; it has four holes (7) near the center of the outlet plate (35) and eight holes (3) for each one of the eight vertexes which enable it to be mounted in any kind of a standard electrical outlet box, It is equipped with four torque pins (4) to avoid the support latches (8) of the multidirectional mounting bracket to receive the torque force when the main unit is rotated at the moment is being aimed at the direction needed. The outlet base has two slots (5) to be assembled with the support latches (8) of the multidirectional mounting bracket and has two threaded inserts (6) to place a secure bolts to avoid the main unit to fall in an unusual event; the outlet base is provided with a pair of cables (1) connected the female electrical contacts (2) designed to be inserted by the male plugs (10) of the multidirectional mounting bracket in order to obtain an electrical power connection to supply of electrical energy the main unit when is installed. The multidirectional mounting bracket has two latches (8) to support the main unit and it also has four holes (9) at the bracket plate (36) to assemble with the outlet torque pins (4) at the moment of the mounting bracket plate is face to face with the outlet plate (35). The multidirectional mounting bracket also has an adjustable mechanism (11) to level the main unit in order to be horizontal or to have enough height clearance by not depending of the ceiling inclination or height; it is provided with a rotor (12) which enables to rotate the main unit at any direction needed and has an adjusting pin (13) which can be inserted through the adjusting perforated holes (34) to set the height of the main unit for the projection of the video, once the pin is inserted can be secure by the pin lock (32) to avoid the pin to lose.

The multidirectional mounting bracket is equipped with two release buttons (33) in the upper part of the mounting bracket and they are designed to be used as a quick attach and release to install and uninstall the main unit by just the press of the buttons to lock and unlock the latches (8).

The main unit is built in a manner that the housing (37) works as an acoustic box, dividing inside the audio section from the projection section to avoid the audio being affected by using the same cavity and to allow to dissipate the lamp heat through the fanned grilled panels (41); it also has a main grilled panel (21) to dissipate heat from amplifiers and power supply; the housing contains main electronic boards and accessories assembled inside; it supports at the bottom on the left and on the right two socket bases (39) to attach the spotlights, one angled wedge (40) for central loudspeaker driver and the main command display (38) in the frontal part.

Figure 3A:
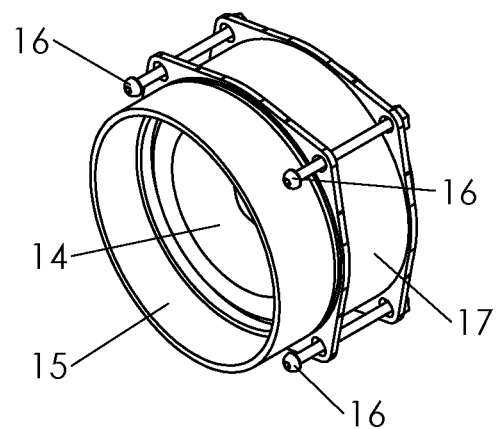
FIG. 3A is a perspective front view of the audio driver dispersion reducer unit.
Figure 3B:
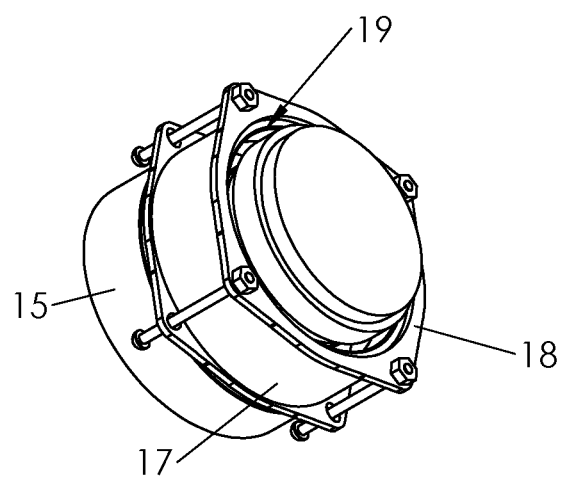
FIG. 3B is a perspective rear view of the audio driver dispersion reducer unit.

In the upper frontal part of the main unit is located the left audio dispersion reducer unit (23) and the right audio dispersion reducer unit (24), each one of these audio dispersion units described in FIG. 3A and FIG. 3B have a tube ring (15) that is used to reduce the audio dispersion of the loudspeaker driver cone (14), each one of this audio dispersion units are tighten by four bolt oppressors (16) that maintain the back tube (17) and muted foam (19) together by compressing the back holed plate (18) against housing. These audio dispersion reducer units are designed to give each of the loudspeakers drivers the ability to enhance the audio sound distance with a narrow audio beam, and the back tube and muted foam is designed to suppress the local audio resonance inside the acoustic box to avoid the listener to perceive the local sound coming from the central area where the main unit of the invention is situated.

The main unit has two channel for overhead loudspeakers drivers, one on the left (20) and one on the right (22) both are located on the left and right opposite angled top of the main unit placed to emit sounds by separated channels that can be reflected on the ceiling so the listener can perceive sound effects of a video soundtrack on the left and right overhead area of the ceiling.

Figure 13:
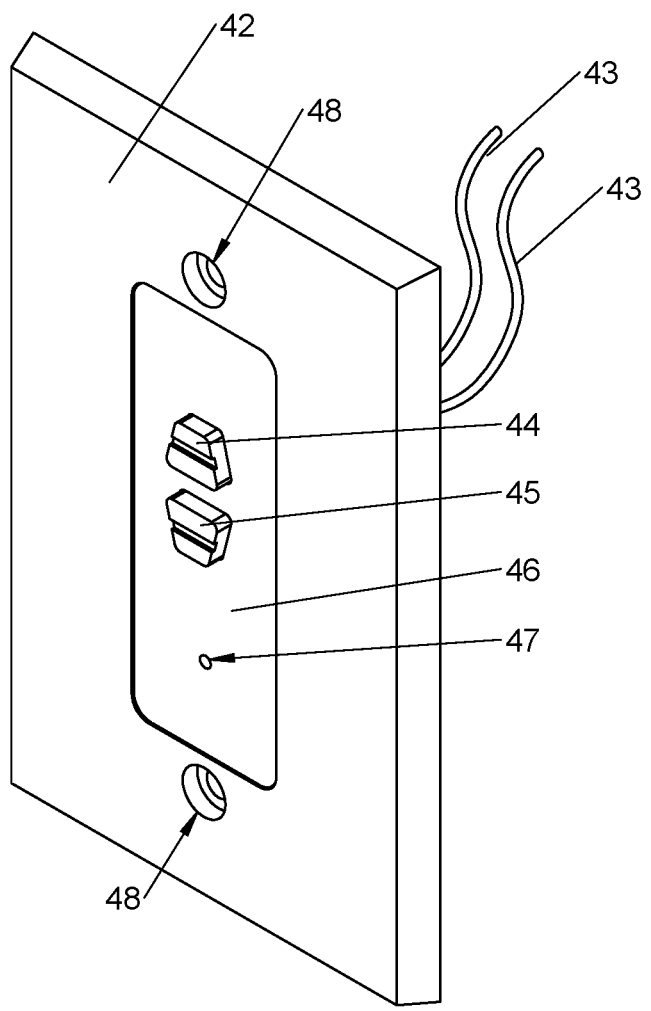
FIG. 13 is a perspective front view of the bridged wall switch with its on and off switch buttons which control the main unit spot lights.

The main unit described has two peripheral devices which are necessary for its functionality, one is a wall bridged switch FIG. 13 that is used to control the spotlights of the main unit without interrupting the electricity that feeds the main unit while it is working, this wall switch has a plate (42) used to be attached to the outlet electricity box through its screw holes (48); the wall bridged switch has two bridged cables (43) used to be connected to the electrical wires of the switch electrical box which controls the local electricity where the main unit is installed, the bridged cables of the wall switch are connected to an independent mini switch (47) used to restart the system by momentarily cutting the electricity when pressed through a thin object that can be introduced to the small hole in the front panel (46); the wall bridged switch has a turn on button (44) and a turn off button (45) that control the spotlights of the main unit through a wireless transmission signal.

Figure 14:
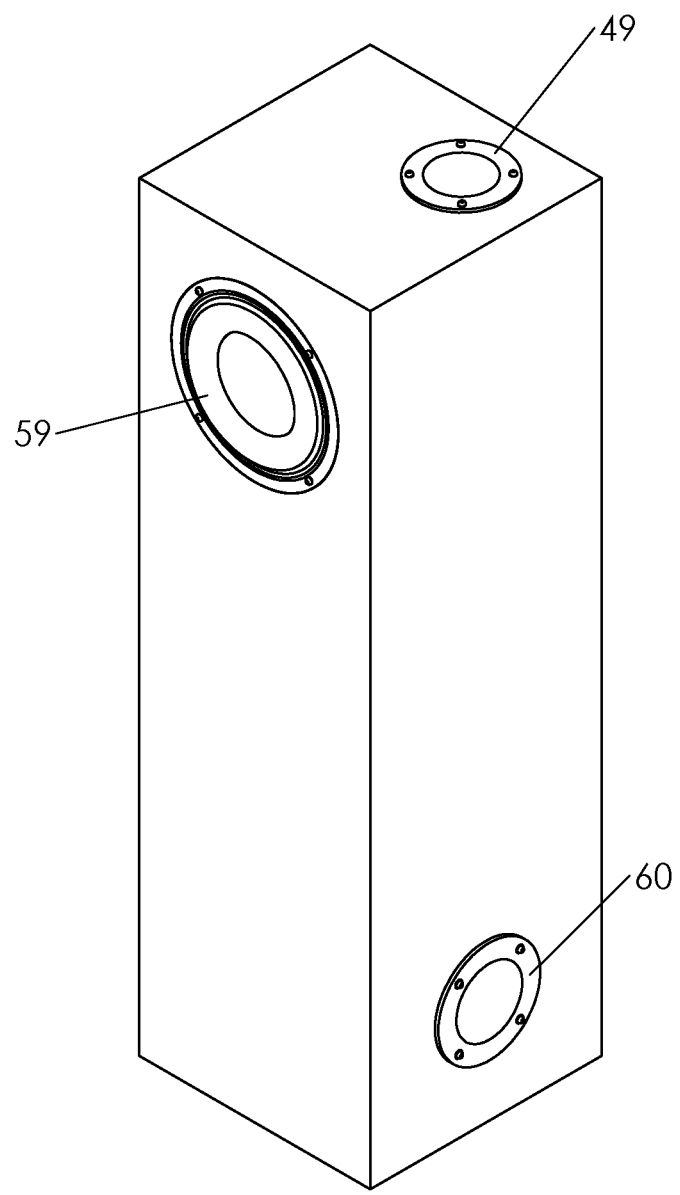
FIG. 14 is a perspective front view of the complete audible and sub-audible double subwoofer unit showing upper driver loudspeaker, upper port tube and bottom port tube.
Figure 15:
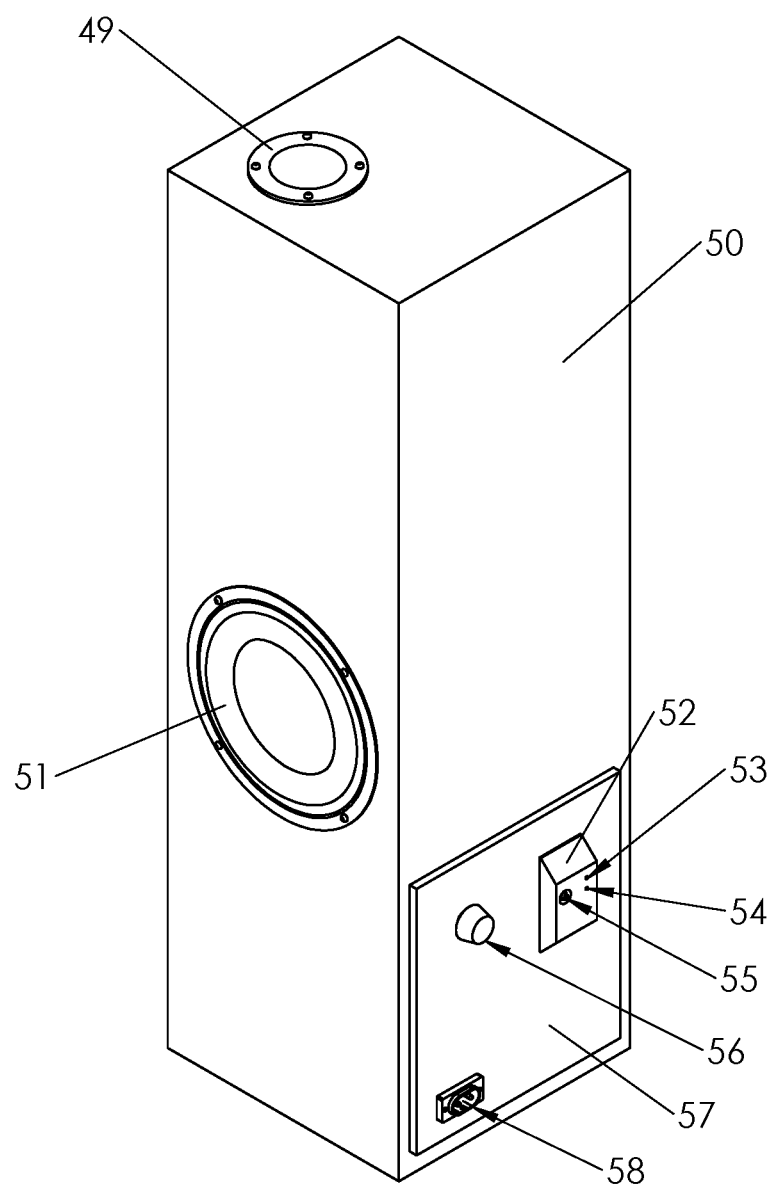
FIG. 15 is a perspective rear view of the complete audible and sub-audible double subwoofer unit showing low driver loudspeaker, upper port tube and back wireless amplifier.

The invention have one other wireless device needed for its operation, it is described as an audible and sub audible wireless subwoofer unit FIG. 14, this unit has at the upper part of the double wireless subwoofer unit a woofer loudspeaker (59) and a port tube (49) used to emit audible low frequencies which can be listened from any place of the room without a specific direction, at the lower part of the unit the lower it is equipped with a port tube (60) and a subwoofer (51) used to emit low frequencies which can be listened and perceived by the sense of hearing and touch from any place of the room or area without a specific direction. At the rear part of the subwoofer unit FIG. 15 it has a plate amplifier (57) that can be connected to the electricity trough the AC connector (58). The plate amplifier has a wireless receiver (52) to receive the signal for the low frequencies that are transmitted from the main unit; this wireless receiver has an ON indicator light (53), a wireless connection light indicator (54), a pairing reset button (55) to reestablish wireless connection in the case is not paired with the main unit and an audio volume knob (56) to control the volume intensity.

Once the invention is installed with all its peripheral devices inside a room as shown on FIG. 16 and FIG. 17 allows the main unit (60) situated on the central part of the ceiling be assisted through the audible and sub audible wireless double subwoofer unit situated on the floor (61), from this position the main unit projects the video and emulates the sounds like they are coming from the images projected on the screen (62) by not being perceived as coming from the upper area where the main unit is located; the bridged wall switch (63) must be located at the electrical box where the room lights interrupter is located to allow to turn on and to turn off the spotlights of the main unit without interrupting the power electricity that provides energy for its operation. All functions of the invention that control all the parameters can be controlled by a universal control and by any compatible device (64) that is plays and sends the signal for the audio and video which allow to control the upper main unit and its peripherals wirelessly from any place in the room.

I claim:

1. Wireless audio and video home theater ceiling projector system which simplifies the installation of audio systems of ten channels comprising: an audio and video home theater projector system wherein the main unit of the system is designed to be mounted in the ceiling and powered through the electrical power provided by the electrical outlet box of any roofed area replacing a lamp located in a room; wherein once mounted the main unit wirelessly receives audio and video signal from any compatible digital device equipped with wireless multimedia which enables the main unit to project the video at any direction needed from the central area where is installed; the main unit decodes the audio signal of a video or movie soundtrack to distribute the sounds by nine separated channels divided in nine directions where the loudspeakers drivers are aimed and which enable the main unit to emit separated sounds and effects to produce a three dimensional sound effect; the main unit transmits wirelessly the tenth channel for audio low frequencies to the double floor subwoofer unit which emit audible and sub audible low frequencies which can be perceived in a room by the sense of hearing and touch at any place in the room without a specific direction; the system comprises an outlet base which mounts on the ceiling and assemble with the integrated multidirectional mounting bracket of the main unit for installation; the multidirectional mounting bracket enables the main unit device to be leveled in any position to compensate the inclination and height of the ceiling to enable to adjust the position of the video projected; the mechanism of the mounting bracket includes a rotor which allows the main unit to have a rotary motion to enable the main unit to project the video at any direction around and allow the loudspeakers drivers to change the layout without losing the audio channels to match with images projected.

2. The audio and video home theater wireless ceiling projector system according to claim 1 comprises, a main unit which can project video and reproduce audio at the same time wherein the nine integrated loudspeaker drivers are divided by channels and aimed to nine different directions to create the effect that the sounds are coming from the place they are aimed.

3. The audio and video home theater wireless ceiling projector system according to claim 1 comprises, a main unit which can be rotated at any direction around the room to project video without the need to reconfigure the nine channels of the loudspeaker drivers.

4. The audio and video home theater wireless ceiling projector system according to claim 1 comprises, a main unit with an integrated multidirectional mounting bracket with multidirectional mechanism to level and adjust the height of the main unit in accordance to the ceiling inclination and height.

5. The audio and video home theater wireless ceiling projector system according to claim 4 comprises, a main unit with an integrated multidirectional mounting bracket wherein the same mounting bracket provide electrical energy to the main unit.

6. The audio and video home theater wireless ceiling projector system according to claim 4 comprises, a main unit with an integrated multidirectional mounting bracket that rotate 360 degrees.

7. The audio and video home theater wireless ceiling projector system according to claim 1 comprises, a main unit with a housing used as an acoustical box for nine loudspeaker drivers divided by channels, said drivers are aimed at different locations in the room to emit sound effects over a free space without furniture obstruction.

8. The audio and video home theater wireless ceiling projector system according to claim 7 wherein the main unit emit narrow individual left and right audio beams directly to the rear wall reflecting the sound effects to be perceived as coming from the rear part of the room without furniture obstruction.

9. The audio and video home theater wireless ceiling projector system according to claim 7 wherein the main unit emit short throw individual left and right channel sound effects directly to the ceiling reflecting the sound to be perceived as coming from the ceiling in the left and right area.

10. The audio and video home theater wireless ceiling projector system according to claim 7 wherein the main unit emit sounds effects aimed to the center frontal part of the room to reflect the sound to be perceived as coming from the center of the screen projected.

11. The audio and video home theater wireless ceiling projector system according to claim 7 wherein the main unit emit sound effects to emulate the left and right sound effects in accordance with the images projected.

12. The audio and video home theater wireless ceiling projector system according to claim 7 wherein the main unit emit audio sounds to emulate ambience sound effects to be perceived as they are in the mid left and right part of the room.

13. The wireless audio and video home theater ceiling projector system according to claim 1 comprises, one double subwoofer unit which emit sound effects which can be perceived in audible way and by the sense of touch without a specific direction and from anywhere in the room.

14. The wireless audio and video home theater wireless ceiling projector system according to claim 1 wherein the main unit mix all sound channels with the double floor subwoofer low frequencies creating a three dimensional sound effect; avoiding the listener to perceive the sounds as coming from the upper area where the main unit is located.

15. The wireless audio and video home theater wireless ceiling projector system according to claim 1 wherein the outlet base of the invention can be used to attach and energize other kind of electrical devices.

16. The wireless audio and video home theater wireless ceiling projector system according to claim 1 wherein the bridged wall switch can be used to connect other electrical devices to the outlet box of the lamp without interrupting electrical energy.

17. The wireless audio and video home theater wireless ceiling projector system according to claim 1 wherein the multidirectional mounting bracket can be used to support and energize other electrical devices.

18. The wireless audio and video home theater wireless ceiling projector system according to claim 1 comprises, an audio angle reducer which enhances the audio distance with a narrow audio beam allowing to be mounted at any acoustical cavity reducing the acoustical resonance.

* * * * *